(12) United States Patent
Liu et al.

(10) Patent No.: US 12,008,801 B1
(45) Date of Patent: Jun. 11, 2024

(54) TRACKING AND IDENTIFICATION METHOD, DEVICE, ELECTRONIC DEVICE, AND STORAGE MEDIUM FOR MULTIPLE VESSEL TARGETS

(71) Applicant: WUHAN UNIVERSITY OF TECHNOLOGY, Wuhan (CN)

(72) Inventors: Wen Liu, Wuhan (CN); Jingxiang Qu, Wuhan (CN); Yu Guo, Wuhan (CN); Mengwei Bao, Wuhan (CN); Chenjie Zhao, Wuhan (CN); Jingxian Liu, Wuhan (CN)

(73) Assignee: WUHAN UNIVERSITY OF TECHNOLOGY, Wuhan (CN)

( * ) Notice: Subject to any disclaimer, the term of this patent is extended or adjusted under 35 U.S.C. 154(b) by 0 days.

(21) Appl. No.: 18/495,776

(22) Filed: Oct. 27, 2023

(30) Foreign Application Priority Data

Apr. 12, 2023 (CN) .......................... 202310387654.3

(51) Int. Cl.
| | |
|---|---|
| *G06V 10/80* | (2022.01) |
| *B63B 79/00* | (2020.01) |
| *G06T 7/246* | (2017.01) |
| *G06T 7/73* | (2017.01) |
| *G06V 10/74* | (2022.01) |
| *G06V 10/82* | (2022.01) |
| *G06V 20/40* | (2022.01) |
| *G06V 20/52* | (2022.01) |

(52) U.S. Cl.
CPC ............ *G06V 10/806* (2022.01); *B63B 79/00* (2020.01); *G06T 7/248* (2017.01); *G06T 7/74* (2017.01);
(Continued)

(58) Field of Classification Search
None
See application file for complete search history.

(56) References Cited

U.S. PATENT DOCUMENTS

| 8,411,969 B1 * | 4/2013 | Joslin ..................... G06V 20/13 |
| | | 382/103 |
| 11,410,002 B2 * | 8/2022 | Yuan ...................... G06V 10/75 |
| 2013/0014584 A1 * | 1/2013 | Nakamura ............. G01S 3/781 |
| | | 73/504.09 |

FOREIGN PATENT DOCUMENTS

| CN | 109460740 A | 3/2019 |
| CN | 113269073 A | 8/2021 |

(Continued)

OTHER PUBLICATIONS

Ryan Wen Liu et al., "Improving maritime traffic surveillance in inland waterways using the robust fusion of AIS and visual data", Ocean Engineering, pp. 1-13, issue date Mar. 16, 2023.

(Continued)

*Primary Examiner* — Vikkram Bali (57) ABSTRACT

Disclosed is a tracking and identification method for multiple vessel targets, devices, electronic device, and storage media. The method comprises: determining the current position of the vessel based on effective AIS data, and projecting it into an image to obtain the visual motion trajectory of the vessel; obtaining target detection boxes corresponding to multiple vessels based on video surveillance data; determining an occluded area based on the target detection boxes of multiple vessels at the previous time, determining the predicted detection box of the occluded area, and loading the appearance features of the predicted detection boxes as the appearance features extracted at the last time before occlusion; integrating effective AIS data from multiple vessels into video surveillance data to determine the vessel's identity. This disclosure can solve the problem of anti-occlusion tracking for vessels in complex vessel navigation scenarios such as severe occlusion and complete occlusion.

11 Claims, 4 Drawing Sheets

(52) U.S. Cl.
CPC ............ *G06V 10/761* (2022.01); *G06V 10/82* (2022.01); *G06V 20/41* (2022.01); *G06V 20/52* (2022.01); *G06T 2207/10016* (2013.01); *G06T 2207/20081* (2013.01); *G06T 2207/20084* (2013.01); *G06T 2207/30232* (2013.01); *G06T 2207/30241* (2013.01); *G06T 2207/30244* (2013.01); *G06V 2201/07* (2022.01)

(56) References Cited

FOREIGN PATENT DOCUMENTS

| | | |
|---|---|---|
| CN | 115147594 A | 10/2022 |
| JP | 2021196949 A | 12/2021 |
| WO | 2022217840 A1 | 10/2022 |

OTHER PUBLICATIONS

Jingxiang Qu et al., "Deep learning-driven surveillance quality enhancement for maritime management promotion under low-visibility weathers", Ocean and Coastal Management, pp. 1-12, issue date Jan. 9, 2023.

Zhao Liu et al., "Data-Driven Identification of Abnormal Behavior of Ships", pp. 1-7, issue date Dec. 31, 2022.

Ryan Wen Liu et al., "Asynchronous Trajectory Matching-Based Multimodal Maritime Data Fusion for Vessel Traffic Surveillance in Inland Waterways", ARXIV, pp. 1-13, issue date Feb. 22, 2023.

\* cited by examiner

TRACKING AND IDENTIFICATION METHOD, DEVICE, ELECTRONIC DEVICE, AND STORAGE MEDIUM FOR MULTIPLE VESSEL TARGETS

FIELD OF THE DISCLOSURE

The disclosure relates to the technical field of vessel tracking, in particular to a tracking and identification method, device, electronic device, and storage medium for multiple vessel targets.

BACKGROUND

Maritime transportation has become one of the mainstream channels for economy and trade, and the requirements for the supervision efficiency of water transportation system are also increasing. In visual monitoring, vessel occlusion caused by overlap of multiple vessel targets makes it impossible to obtain the position and motion characteristics of all vessel targets within the visual field in the visual data. In addition, the problem of accurate identification in multi-vessel target scenarios has not been effectively solved.

In water traffic scene, due to slow movement of vessels, the occlusion time is often longer and the occlusion ratio is large. It is still difficult to achieve anti occlusion and tracking of targets in complex vessel navigation scenarios such as severe occlusion, complete occlusion, and long-term occlusion.

SUMMARY

The purpose of this disclosure is to provide a tracking and identification method, device, electronic device, and storage medium for multiple vessel targets to overcome the technical problem of anti-occlusion tracking of vessels in complex vessel navigation scenarios such as severe occlusion, complete occlusion, and long-term occlusion.

This disclosure provides a tracking and identification method for multiple vessel targets, comprising:
  obtaining video surveillance data and initial AIS data;
  filtering the initial AIS data to obtain effective AIS data;
  based on the effective AIS data, determining the current position of a vessel, based on the parameters of a camera, obtaining the video surveillance data, based on the parameters of the camera, combined with a pinhole imaging model, projecting the current position of the vessel to an image coordinate system corresponding to the video surveillance data; extracting the motion characteristics of the effective AIS data in the video surveillance data from the projected data, and obtaining the visual motion trajectory of the vessel based on the motion characteristics of the effective AIS data in the video surveillance data;
  inputting the video surveillance data into a target detection network to obtain target detection boxes corresponding to multiple vessels; the target detection network is obtained based on the training of Yolov5-s network;
  determining an occluded area based on the target detection boxes corresponding to the multiple vessels at the previous time, after deleting the part of the target detection boxes corresponding to the multiple vessels at the current time that falls into the occluded area, determining a prediction detection box of the occluded area based on the visual tracking trajectory of the vessel at the previous time, and determining real-time appearance features based on the appearance features of the prediction detection box before occlusion;
  inputting the prediction detection box, the real-time appearance features, and the target detection boxes under a non-occlusion state at the current time into a preset DeepSORT algorithm model, and carrying out the anti-occlusion tracking of the vessel based on the preset DeepSORT algorithm model to obtain a visual tracking trajectory of the vessel at the current time;
  based on the visual motion trajectory and the visual tracking trajectory of the vessel at the current time, fusing the effective AIS data corresponding to the multiple vessels into the video surveillance data to determine identities of the multiple vessels;
  wherein: the parameters of the camera include: position of the camera, orientation of the camera, horizontal field angle of the camera, vertical field angle of the camera, height of the camera from water surface, and resolution of the video surveillance data taken by the camera.

Compared with the prior art, the beneficial effects of this disclosure are: by acquiring video surveillance data and initial AIS data, the initial AIS data is filtered to obtain effective AIS data; based on the effective AIS data, the position of the vessel at the current time is determined, and the position of the vessel at the current time is projected into an image corresponding to the video surveillance data to obtain the visual motion trajectory of the vessel. The video surveillance data is input into the target detection network to obtain target detection boxes corresponding to multiple vessels. An occluded area is determined based on the target detection boxes corresponding to multiple vessels in the previous time. after deleting the part of the target detection boxes corresponding to the multiple vessels at the current time that falls into the occluded area, determining a prediction detection box of the occluded area based on the visual tracking trajectory of the vessel at the previous time, and determining real-time appearance features based on the appearance features of the prediction detection box before occlusion; inputting the prediction detection box, the real-time appearance features, and the target detection boxes under a non-occlusion state at the current time into a preset DeepSORT algorithm model, and carrying out the anti-occlusion tracking of the vessel based on the preset DeepSORT algorithm model to obtain a visual tracking trajectory of the vessel at the current time; based on the visual motion trajectory and the visual tracking trajectory of the vessel at the current time, fusing the effective AIS data corresponding to the multiple vessels into the video surveillance data to determine identities of the multiple vessels; The method based on video and AIS data fusion is more robust and is not limited by the content of the database. It can effectively solve the problem of unstable vessel target tracking in water traffic video supervision, and the problem of anti-occlusion tracking of vessels in complex vessel navigation scenarios such as severe occlusion, complete occlusion, and long-term occlusion. It is of great significance to ensure the safety of ship navigation and improve the efficiency of water traffic supervision.

BRIEF DESCRIPTION OF THE DRAWINGS

Accompanying drawings are for providing further understanding of embodiments of the disclosure. The drawings form a part of the disclosure and are for illustrating the principle of the embodiments of the disclosure along with the literal description. Apparently, the drawings in the description below are merely some embodiments of the disclosure, a person skilled in the art can obtain other drawings according to these drawings without creative efforts. In the figures.

DETAILED DESCRIPTION OF PREFERRED EMBODIMENTS

The technical solutions in the embodiments of the application will be described clearly and completely in combination with the drawings in the embodiments of the application.

This disclosure provides a tracking and identification method, device, electronic device, and storage medium for multiple vessel targets, which will be described separately below.

Figure 1:
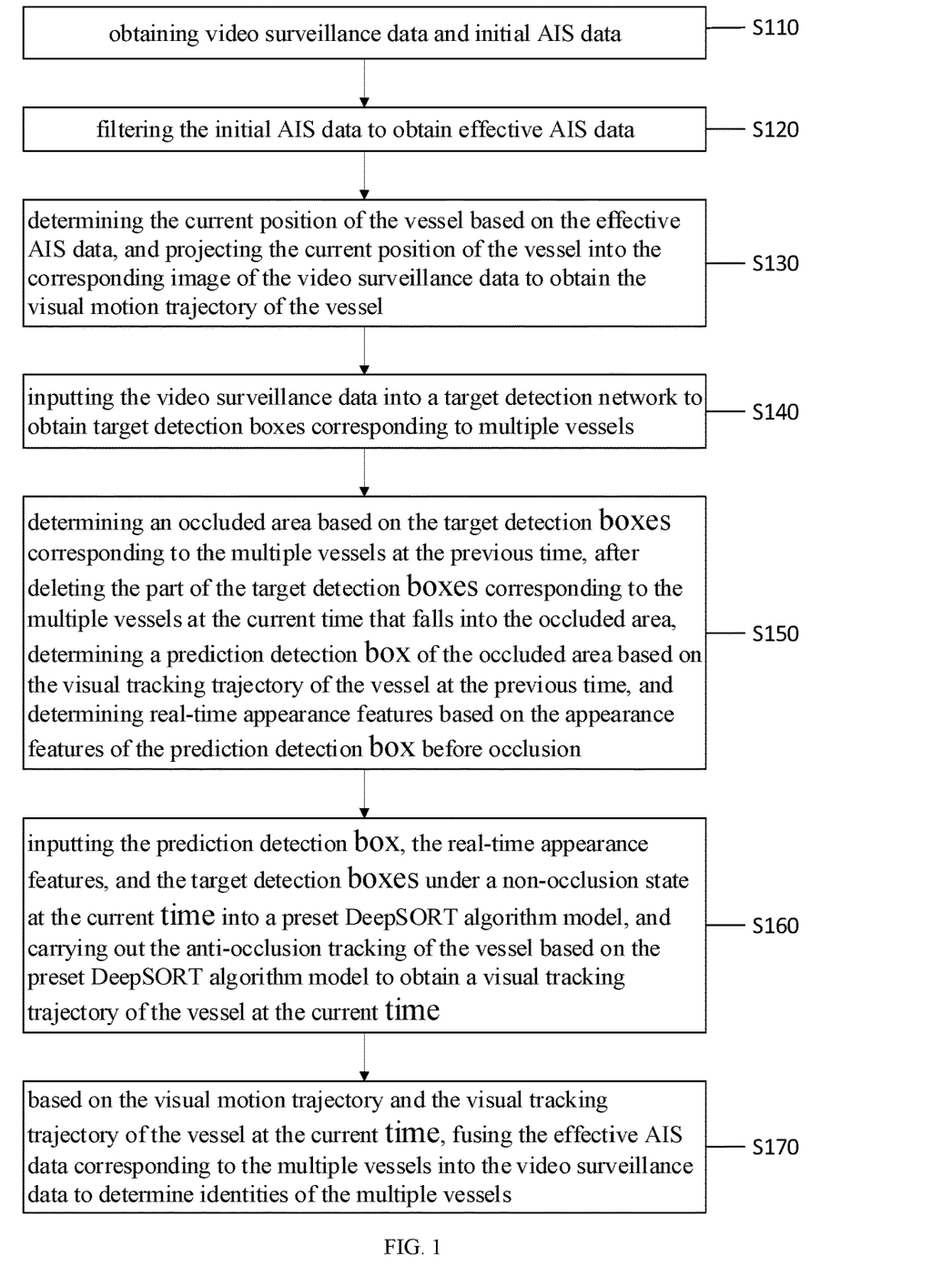
FIG. 1 is a flow diagram of an embodiment of the tracking and identification method for multiple vessel targets provided by this disclosure.

As shown in FIG. 1, this disclosure provides a tracking and identification method for multiple vessel targets, comprising:

S110, obtaining video surveillance data and initial AIS data.

It is understood that the video surveillance data can be collected by surveillance device, such as cameras. AIS data refers to receiving AIS message information sent by ships through low-orbit satellites, and then forwarding the received and decoded AIS message information to corresponding earth stations, so that land management agencies can grasp relevant dynamic information of ships and realize the monitoring of ships sailing in far-sea waters. Among them, the initial AIS data may contain some duplicate data and seriously inconsistent data.

When collecting video surveillance data through the surveillance device, recording the location, direction, field of view Angle, and other parameters of the surveillance device, as well as real-time time stamps of AIS data and video surveillance data, specifically:

Parameters of visual acquisition equipment include longitude and latitude of camera position, camera orientation, camera horizontal field angle, camera vertical field angle, camera height from water surface, camera resolution of image data, and video acquisition time stamp. AIS data includes Maritime Mobile Service Identify (MMSI) number, speed, course, and ship latitude and longitude coordinates.

AIS and visual data are received synchronously. The time stamp is based on the receiving device. If different devices receive the data, the time deviation is required to be less than 1 second.

S120, filtering the initial AIS data to obtain effective AIS data;

It is understandable that the original AIS data received should be filtered to eliminate AIS data with data missing, data duplication, data serious deviation, and other problems. Specifically:

Data filtering is conducted to address issues such as data duplication, missing data, and data errors caused by damage to vessel equipment in AIS source data due to the unreliable transmission method used by AIS in the very high frequency band. Subsequently, taking into account the ship to ground heading and ship position data in AIS data, deleting AIS data that may not appear in video capture devices in the future, and performing a filtering operation every second.

In some embodiments, the effective AIS data comprises: vessel speed, vessel course, and vessel latitude and longitude coordinates.

S130, determining the current position of the vessel based on the effective AIS data, and projecting the current position of the vessel into the corresponding image of the video surveillance data to obtain the visual motion trajectory of the vessel.

It can be understood that based on the filtered AIS data (i.e., the effective AIS data), combined with kinematic equation of vessel, the vessel's navigation trajectory is calculated and the current position of the vessel is predicted.

The kinematic equation of vessel can be expressed as:

$$Lon_n = Lon_{n-1} + V_{lon} * T,$$

$$Lat_n = Lat_{n-1} + V_{lat} * T,$$

where, $Lon_n$ and $Lat_n$ represent the longitude and latitude coordinates of the vessel at the current time, $Lon_{n-1}$ and $Lat_{n-1}$ represent the longitude and latitude coordinates of the vessel in the previous second (i.e., the previous time), $V_{lon}$ and $V_{lat}$ represent the component of the vessel's speed along the longitude and latitude directions, and T represents the time difference between the two times. The kinematic equation of vessel can be used to calculate the current AIS data based on historical AIS data.

Vessel motion trajectory calculation refers to extracting the longitude and latitude coordinates of the vessel at the current time from AIS data, as well as the components of the vessel's speed along the longitude and latitude directions, and calculating the longitude and latitude coordinates of the vessel's position at the next time based on kinematic equations. The calculation operation is performed every second.

S140, inputting the video surveillance data into a target detection network to obtain target detection boxes corresponding to multiple vessels.

It can be understood that when visual data is input into the target detection network for vessel target detection, the output target detection box BBox can be represented as:

$$BBox = (x_1, y_1, x_2, y_2)$$

where, $x_1$, $x_2$, $y_1$, $y_2$ represent the horizontal and vertical coordinates of the four vertices of the rectangular detection box for vessel target detection results in the image coordinate system. Then, based on the occluded area formed by the previous second's tracking results, determining whether it falls within the occluded area. If so, performing the deletion operation.

Furthermore, the target detection network is trained based on the following steps:

Collecting and producing a dataset of 20000 images, and annotating the images for training in vessel target detection networks;

20000 images are collected as a dataset of underwater vessel target detection at different times and angles in actual regulatory scenarios;

Training the target detection network using the produced dataset, saving the training parameter results, and achieving higher accuracy in target detection capabilities.

The target detection network specifically uses the Yolov5-s target detection network, detects every second, and applies to all video frames in the current second.

S150, determining an occluded area based on the target detection boxes corresponding to the multiple vessels at the previous time, after deleting the part of the target detection boxes corresponding to the multiple vessels at the current time that falls into the occluded area, determining a prediction detection box of the occluded area based on the visual tracking trajectory of the vessel at the previous time, and determining real-time appearance features based on the appearance features of the prediction detection box before occlusion.

It can be understood that based on the tracking results of the previous second, that is, the target detection boxes corresponding to the multiple vessels in the previous time, visual trajectory prediction is performed on the tracking vessel ID that falls within the occluded area, specifically:

Assuming there is obstruction at time $t_n$, then using the image frame of the previous time $t_{n-1}$ as a reference, trajectory prediction is performed based on the motion features of the visual trajectory corresponding to this ID. The prediction results can be expressed as:

$$\vec{P}_n = \vec{P}_{n-1} + \vec{V}_p$$

$$L_n = L_{n-1}$$

$$W_n = W_{n-1}$$

where, $\vec{P}_n$, $L_n$, $W_n$ represent the tracking results predicted based on kinematic equations, $\vec{P}_{n-1}$, $L_{n-1}$, $W_{n-1}$ represent the visual tracking result of the previous second. $\vec{P}_n$ and $\vec{P}_{n-1}$ is the center of the current and historical time tracking boxes, $L_n$ and $L_{n-1}$ represent the length of the current and historical time tracking boxes, $W_n$ and $W_{n-1}$ represent the width of the current and historical time tracking boxes, $\vec{V}_p$ represents the average motion speed of the vessel's visual tracking trajectory, which can be expressed as:

$$\vec{V}_p = \frac{(\vec{P}_n - \vec{P}_{n-\theta})}{\theta}$$

where, $\theta$ represents an artificially set reference time, with a default value of 5 seconds. After obtaining the prediction results, the appearance features of the prediction box are saved as the appearance features extracted by the DeepSORT algorithm at the last moment before occlusion. Cascading the predicted results with the current unobstructed detection result features, and inputting them into the DeepSORT algorithm for matching to obtain the IDs of all targets. Subsequently, updating the occluded area to provide the latest occluded area for anti-occlusion tracking in the next time. The decision threshold for the occluded area can be expressed as:

$$\omega = \frac{S_0}{\min(Bbox_1, Bbox_2, \ldots, Bbox_n)}$$

where, $S_o$ represents the area of the overlapping area, $Bbox_1$, $Bbox_2$, ..., $Bbox_n$ represent the detection box area of several vessels shielded from each other. In general experiments, the determination threshold $\omega$ is set as 0.5.

Furthermore, the multi target anti occlusion tracking algorithm can obtain the ID number of the vessel in the field of view and the corresponding complete visual motion trajectory of the ship.

Appearance features refer to the appearance features extracted through convolutional neural networks that need to be referenced during ID allocation in the DeepSORT algorithm.

S160, inputting the prediction detection box, the real-time appearance features, and the target detection boxes under a non-occlusion state at the current time into a preset DeepSORT algorithm model, and carrying out the anti-occlusion tracking of the vessel based on the preset DeepSORT algorithm model to obtain a visual tracking trajectory of the vessel at the current time;

It can be understood that the DeepSORT algorithm extracts the motion position deviation and appearance feature deviation of historical trajectories and current detection boxes respectively through Kalman filters and convolutional neural networks, and then assigns IDs through the Hungarian algorithm.

S170, based on the visual motion trajectory and the visual tracking trajectory of the vessel at the current time, fusing the effective AIS data corresponding to the multiple vessels into the video surveillance data to determine identities of the multiple vessels;

It can be understood that after inputting the predicted detection box and its appearance features, as well as the real-time target detection box in non-occluded state, into the preset DeepSORT algorithm model, the visual tracking trajectory of the vessel at the current time is obtained. Based on the visual tracking trajectory of the vessel at the current time, the effective AIS data corresponding to multiple vessels are fused into the video surveillance data to identify and track the identities of multiple vessel targets, The method based on video and AIS data fusion has stronger robustness and is not limited by database content.

Furthermore, based on the visual motion trajectory and the visual tracking trajectory of the vessel at the current time, fusing the effective AIS data corresponding to the multiple vessels into the video surveillance data to determine identities of the multiple vessels, comprising:

based on the visual motion trajectory of the vessel, extracting motion characteristics of the effective AIS data in the video surveillance data;

carrying out similarity measurement between the motion characteristics of the effective AIS data in the video surveillance data and motion characteristics of the visual tracking trajectory of the vessel at the current time, and obtaining a result of the similarity measurement;

based on the result of the similarity measurement, fusing the effective AIS data corresponding to the multiple vessels into the video surveillance data to determine the identities of the multiple vessels.

It can be understood that the visual tracking trajectory of the vessel formed by the anti-occlusion tracking algorithm extracts the visual trajectory motion features (speed, heading, position), and measures the similarity with the ship motion features extracted from the AIS longitude and latitude data projected onto the image coordinate system. Specifically:

Based on the projected motion features and visual trajectory motion features of the input AIS data, the similarity is calculated from three angles: motion direction, motion speed, and current position. The normalized Euclidean distance is used as the similarity evaluation index between the motion speed and current position features. The speed deviation is recorded as $\hat{C}_s$. Record the position deviation as $\hat{C}_l$. It can be expressed as:

$$\hat{C}_s = \sqrt{(D_{Ai} - D_{Vj})^2}$$

$$\hat{C}_l = \sqrt{(x_{Ai} - x_{Vj})^2 + (y_{Ai} - y_{Vj})^2}$$

where, $D_{Ai}$ represents the sailing speed of the i-th vessel in the visual motion trajectory extracted from AIS longitude and latitude data projected onto the image coordinate system, $D_{Vj}$ represents the sailing speed of the jth vessel in the video footage. $x_{Ai}$ and $y_{Ai}$ represent the horizontal and vertical coordinates of the i-th vessel in the visual motion trajectory extracted from AIS longitude and latitude data projected onto the image coordinate system, $x_{Vj}$ and $y_{Vj}$ represent the horizontal and vertical coordinates of the jth vessel in the video image. After standardizing $\hat{C}_s$ and $\hat{C}_l$ separately, the speed and position similarity $C_s$ and $C_l$ are obtained.

The consistency of motion direction plays a decisive role in practical fusion applications, and its similarity Ce can be expressed as:

$$C_c = \begin{cases} 0, & |d(COG) - d(ves)| \leq \rho \\ 1, & |d(COG) - d(ves)| > \rho \end{cases}$$

where, d(COG) represents the vessel motion direction extracted from the visual motion trajectory of the vessel after AIS longitude and latitude data is projected onto the image coordinate system, and d(ves) represents the vessel direction in the video image, ρ is set to 90 degrees, that is, when the angle difference between the two motion directions is greater than 90 degrees, it is judged as uncorrelated.

Measurement of motion feature similarity refers to the calculation of standardized Euclidean distances between each feature based on the current position, motion speed, and motion direction, as a similarity evaluation index between features.

Furthermore, based on the result of the similarity measurement, fusing the effective AIS data corresponding to the multiple vessels into the video surveillance data to determine the identities of the multiple vessels, comprising:
based on the result of the similarity measurement and a preset weight coefficient, constructing a total similarity function;
constructing a cost matrix based on an output result of the total similarity function;
determining an optimal matching result of the cost matrix based on the Hungarian algorithm;
based on the optimal matching result, fusing the effective AIS data corresponding to the multiple vessels into the video surveillance data to determine the identities of the multiple vessels.

It can be understood that data fusion refers to calculating the similarity between the motion features of the vessel's visual motion trajectory projected onto the image coordinate system by AIS longitude and latitude data and the vessel's motion features in the video frame, and then assigning corresponding weight coefficients to the similarity, creating a total similarity function, and using the output results of the total similarity function to construct a cost matrix. Using the Hungarian algorithm to obtain the optimal matching result of the cost matrix, AIS data is fused into visual data (i.e., the video surveillance data) based on the matching result. The matching operation is performed every second and applies to all video frames in the current second.

Based on the similarity measurement results, the Hungarian algorithm is used to obtain the optimal match between AIS data trajectory points and visual data trajectory points. The AIS data of each ship target is fused into video data to achieve multi ship target identity recognition. The expression for the total cost function (i.e., the total similarity function) is:

$$C_g = \lambda_1 \cdot C_c + \lambda_2 \cdot C_d + \lambda_3 \cdot C_s$$

where, $C_g$ represents the total cost indicator, $C_c$ represents the similarity in the direction of motion, $C_s$ represents the similarity of motion speed, $C_l$ represents distance similarity, $\lambda_1$, $\lambda_2$ and $\lambda_3$ represent the weight corresponding to each similarity, wherein $\lambda_1$ is set to 1000 to avoid fusing data with excessive angle deviation, $\lambda_2$ and $\lambda_3$ are both set to 0.5. using $C_g$ as an element of the cost matrix to construct the cost matrix. Finally, the Hungarian algorithm is used to solve the cost matrix to obtain the optimal matching strategy, thereby achieving fusion matching between AIS data and vessel targets in visual data, and displaying vessel AIS information in visual data.

In some embodiments, the position of the vessel at the current time is projected onto the image corresponding to the video surveillance data to obtain the visual motion trajectory of the vessel, comprising:
based on the parameters of a camera, obtaining the video surveillance data, based on the parameters of the camera, combined with a pinhole imaging model, projecting the current position of the vessel to an image coordinate system corresponding to the video surveillance data; extracting the motion characteristics of the effective AIS data in the video surveillance data from the projected data, and obtaining the visual motion trajectory of the vessel based on the motion characteristics of the effective AIS data in the video surveillance data;
wherein: the parameters of the camera include: position of the camera, orientation of the camera, horizontal field angle of the camera, vertical field angle of the camera, height of the camera from water surface, and resolution of the video surveillance data taken by the camera.

It can be understood that visual image data and AIS data are synchronously collected, and specific parameters of the camera are recorded, including the latitude and longitude of the camera position, camera orientation, camera horizontal field of view angle, camera vertical field of view angle, camera height from the water surface, and resolution of the camera captured image data.

Based on the detailed parameters of the camera itself, a small hole imaging model is used to achieve coordinate transformation between the longitude and latitude coordinate system and the image coordinate system. AIS longitude and latitude data is projected onto the image coordinate system, and the motion features corresponding to the ship visual motion trajectory and the ship visual motion trajectory are extracted (i.e., the ship motion features).

Furthermore, based on the parameters of the camera, combined with a pinhole imaging model, projecting the current position of the vessel to an image coordinate system corresponding to the video surveillance data, comprising:
based on the parameters of the camera, the pinhole imaging model, and the characteristic information of the vessel, constructing a geometric relation between view angle of the transverse and longitudinal field of the camera and the position of the vessel at the current time;

based on the geometric relation, determining the horizontal and vertical coordinates of the vessel in the image corresponding to the effective AIS data, and projecting the position of the vessel at the current time to the image coordinate system based on the horizontal and vertical coordinates of the vessel in the image corresponding to the video surveillance data.

It can be understood that based on the anti-occlusion tracking algorithm, the vessel's visual tracking trajectory extracts the visual trajectory motion features (speed, heading, position), and measures the similarity with the vessel motion features calculated from the AIS vessel longitude and latitude data projected onto the image coordinate system.

Based on the motion features and visual trajectory motion features projected from the input AIS ship longitude and latitude data, the similarity is calculated from three angles: motion direction, motion speed, and current position. The normalized Euclidean distance is used as the similarity evaluation index between the motion speed and current position. The speed deviation is recorded as $\hat{C}_s$, the position deviation is recorded as $\hat{C}_l$. They can be expressed as:

$$\hat{C}_s = \sqrt{(D_{Ai} - D_{Vj})^2}$$
$$\hat{C}_l = \sqrt{(x_{Ai} - x_{Vj})^2 + (y_{Ai} - y_{Vj})^2}$$

where, $D_{Ai}$ represents the navigation speed of the i-th vessel in the visual motion trajectory extracted from AIS ship longitude and latitude data projected onto the image coordinate system, $D_{Vj}$ represents the sailing speed of the jth ship in the video footage. $x_{Ai}$ and $y_{Ai}$ represents the horizontal and vertical coordinates of the i-th vessel in the visual motion trajectory extracted from AIS longitude and latitude data projected onto the image coordinate system, $x_{Vj}$ and $y_{Vj}$ represents the horizontal and vertical coordinates of the jth vessel in the video image. After standardizing $\hat{C}_s$ and $\hat{C}_l$ separately, the speed and position similarity $C_s$ and $C_l$ are obtained.

The consistency of motion direction plays a decisive role in practical fusion applications, and its similarity Ce can be expressed as:

$$C_c = \begin{cases} 0, |d(COG) - d(ves)| \le \rho \\ 1, |d(COG) - d(ves)| > \rho \end{cases}$$

where, d(COG) represents the vessel motion direction extracted from the visual motion trajectory of the vessel after AIS longitude and latitude data is projected onto the image coordinate system, and d(ves) represents the vessel direction in the video image. p is set to 90 degrees, that is, when the angle difference between the two motion directions is greater than 90 degrees, it is judged as uncorrelated.

In some embodiments, determining an occluded area based on the target detection boxes corresponding to the multiple vessels at the previous time, comprising:

in the target detection box corresponding to the multiple vessels at the previous time, the target detection box whose overlap degree with other target detection boxes is higher than a set threshold value is determined as the occluded area.

It can be understood that the occluded area refers to the detection of the overlap between boxes to determine whether they are in an occluded state. For detection boxes with an overlap greater than the set threshold, they are considered as occluded areas.

Figure 2:
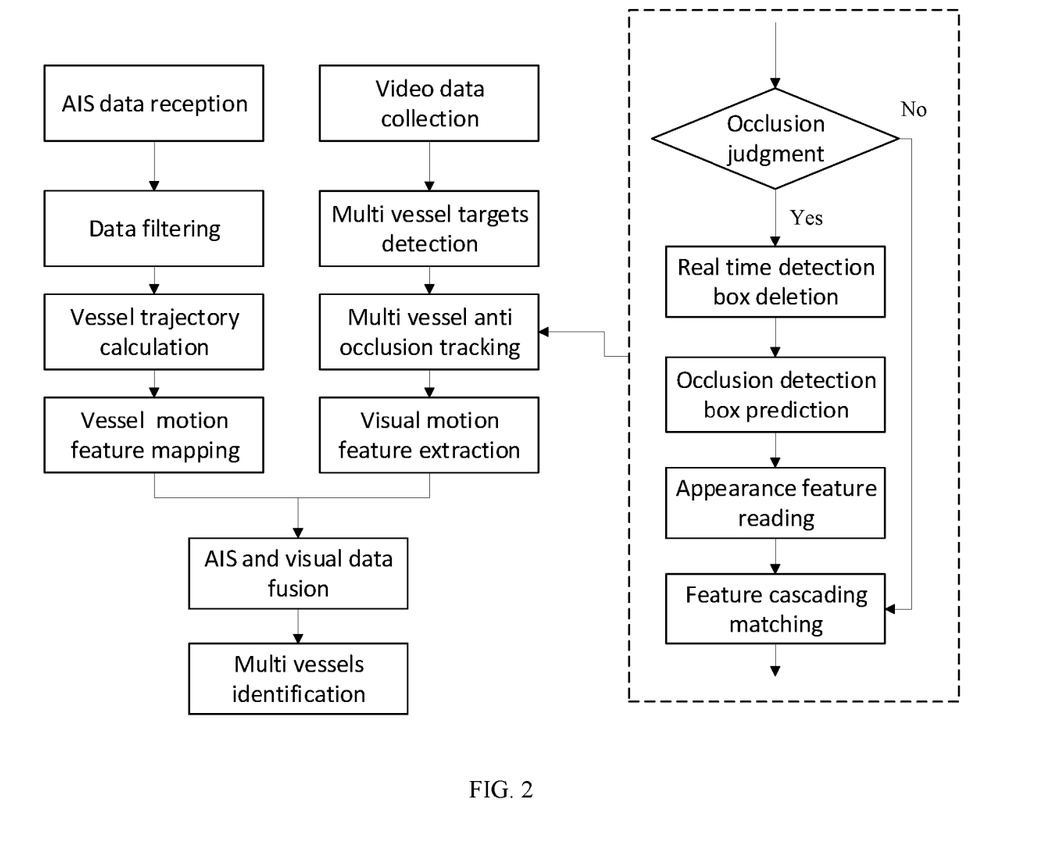
FIG. 2 is a flow diagram of another embodiment of the tracking and identification method for multiple vessel targets provided by this disclosure.

In other embodiments, the flowchart of the tracking and identification method for multiple vessel targets provided by this disclosure is shown in FIG. 2. This disclosure proposes an anti-occlusion multi vessel target tracking and identification method based on video data and AIS data fusion to address the widespread problem of ship occlusion tracking and identification in maritime supervision. A vessel anti occlusion tracking algorithm has been proposed to address the issue of occlusion, and a strategy of integrating AIS data and visual data has been proposed to achieve the matching of visual ship targets with AIS data for identity recognition, thereby achieving accurate recognition of ship targets. This disclosure successfully solves the problem of multiple ship tracking being affected by vessel occlusion in water traffic scenarios, as well as the problem of vessel identification.

In summary, by acquiring video surveillance data and initial AIS data, the initial AIS data is filtered to obtain effective AIS data; based on the effective AIS data, the position of the vessel at the current time is determined, and the position of the vessel at the current time is projected into an image corresponding to the video surveillance data to obtain the visual motion trajectory of the vessel. The video surveillance data is input into the target detection network to obtain target detection boxes corresponding to multiple vessels. An occluded area is determined based on the target detection boxes corresponding to multiple vessels in the previous time. after deleting the part of the target detection boxes corresponding to the multiple vessels at the current time that falls into the occluded area, determining a prediction detection box of the occluded area based on the visual tracking trajectory of the vessel at the previous time, and determining real-time appearance features based on the appearance features of the prediction detection box before occlusion; inputting the prediction detection box, the real-time appearance features, and the target detection boxes under a non-occlusion state at the current time into a preset DeepSORT algorithm model, and carrying out the anti-occlusion tracking of the vessel based on the preset DeepSORT algorithm model to obtain a visual tracking trajectory of the vessel at the current time; based on the visual motion trajectory and the visual tracking trajectory of the vessel at the current time, fusing the effective AIS data corresponding to the multiple vessels into the video surveillance data to determine identities of the multiple vessels; The method based on video and AIS data fusion is more robust and is not limited by the content of the database. It can effectively solve the problem of unstable vessel target tracking in water traffic video supervision, and the problem of anti-occlusion tracking of vessels in complex vessel navigation scenarios such as severe occlusion, complete occlusion, and long-term occlusion. It is of great significance to ensure the safety of ship navigation and improve the efficiency of water traffic supervision.

Figure 3:
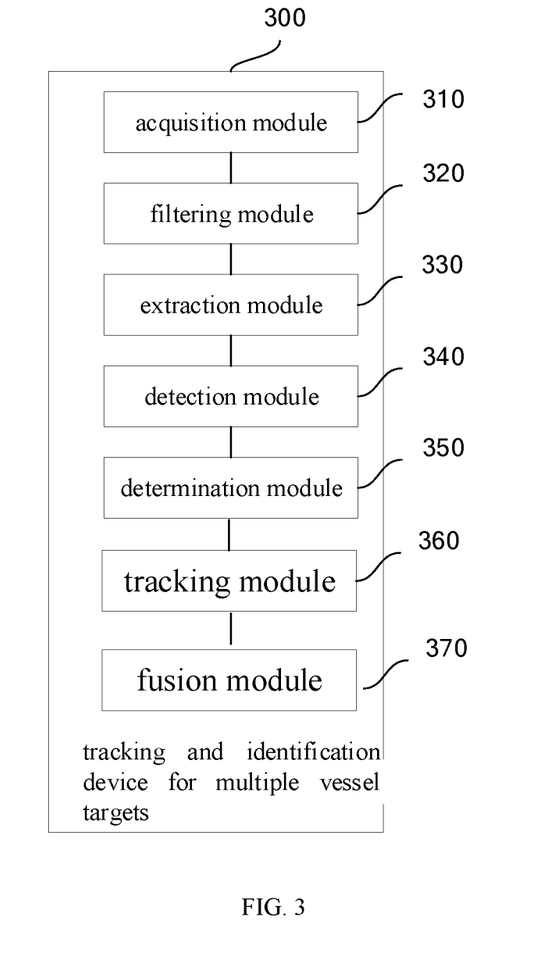
FIG. 3 is a schematic diagram of the structure of an embodiment of the tracking and recognition device for multiple vessel targets provided by this disclosure.

As shown in FIG. 3, this disclosure also provides a tracking and identification device for multiple vessel targets 300, comprising:

an acquisition module 310, which is used to obtain video surveillance data and initial AIS data;

a filtering module 320, which is used to filter the initial AIS data to obtain effective AIS data;

an extraction module 330, which is used to determine the current position of a vessel based on the effective AIS data, to obtain the video surveillance data based on the parameters of a camera, to project the current position of the vessel to an image coordinate system corresponding to the video surveillance data based on the parameters of the camera, combined with a pinhole imaging model, to extract the motion characteristics of the effective AIS data in the video surveillance data from the projected data, and to obtain the visual motion trajectory of the vessel based on the motion characteristics of the effective AIS data in the video surveillance data;

a detection module 340, which is used to input the video surveillance data into a target detection network to obtain target detection boxes corresponding to multiple vessels; the target detection network is obtained based on the training of Yolov5-s network;

a determination module 350, which is used to determine an occluded area based on the target detection boxes corresponding to the multiple vessels at the previous time, after deleting the part of the target detection boxes corresponding to the multiple vessels at the current time that falls into the occluded area, determining a prediction detection box of the occluded area based on the visual tracking trajectory of the vessel at the previous time, and determining real-time appearance features based on the appearance features of the prediction detection box before occlusion;

a tracking module 360, which is used to input the prediction detection box, the real-time appearance features, and the target detection boxes under a non-occlusion state at the current time into a preset DeepSORT algorithm model, and carrying out the anti-occlusion tracking of the vessel based on the preset DeepSORT algorithm model to obtain a visual tracking trajectory of the vessel at the current time;

a fusion module 370, which is used to fuse the effective AIS data corresponding to the multiple vessels into the video surveillance data based on the visual motion trajectory and the visual tracking trajectory of the vessel at the current time to determine identities of the multiple vessels.

The tracking and identification method for multiple vessel targets provided in the above embodiments can achieve the technical solution described in the above embodiments of tracking and identification method for multiple vessel targets. The specific implementation principles of each module or unit can be seen in the corresponding content of the above embodiments of tracking and identification method for multiple vessel targets, and will not be repeated here.

Figure 4:
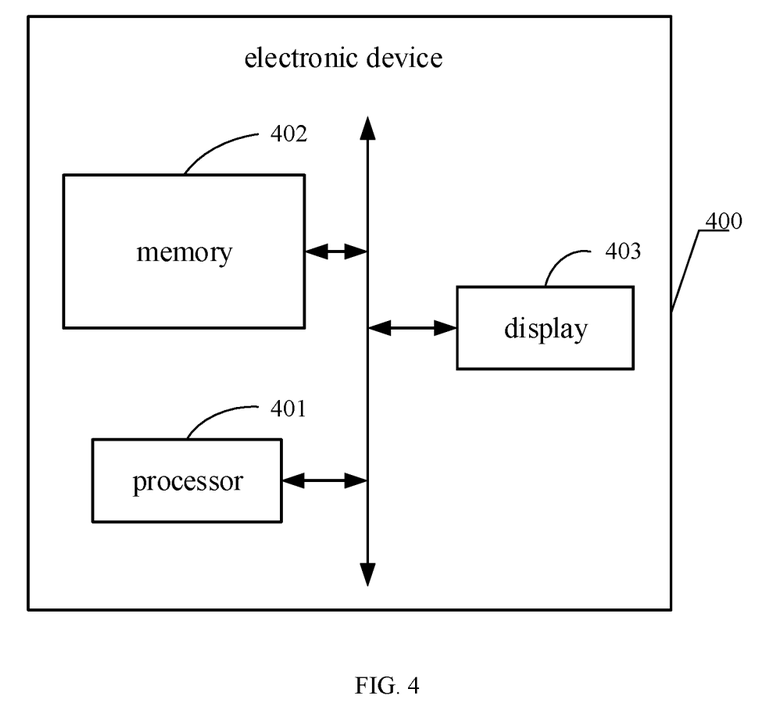
FIG. 4 is a schematic structure of an embodiment of the electronic device provided by this disclosure.

As shown in FIG. 4, this disclosure also provides an electronic device 400 accordingly. The electronic device 400 comprises a processor 401, a memory 402, and a display 403. FIG. 4 only shows some components of electronic device 400, but it should be understood that it is not required to implement all the components shown, and more or fewer components can be implemented as an alternative.

In some embodiments, memory 402 may be an internal storage unit of electronic device 400, such as a hard disk or memory of electronic device 400. In other embodiments, memory 402 can also be an external storage device of electronic device 400, such as a plug-in hard disk, Smart Medium Card (SMC), Secure Digital (SD) card, Flash Card, etc. provided on electronic device 400.

Furthermore, memory 402 may comprise both internal storage units of electronic device 400 and external storage devices. Memory 402 is used to store application software and various types of data for installing electronic device 400.

In some embodiments, processor 401 may be a Central Processing Unit (CPU), microprocessor, or other data processing chip used to run program code stored in memory 402 or process data, such as tracking and identification method for multiple vessel targets in this disclosure.

In some embodiments, the display 403 can be an LED display, a liquid crystal display, a touch LCD display, and an OLED (Organic Light Emitting Diode) touchscreen. Display 403 is used to display information on electronic device 400 and to display a visual user interface. The components 401 to 403 of electronic device 400 communicate with each other through the system bus.

In some embodiments of this disclosure, when the processor 401 executes the tracking and identification program for multiple vessel targets in the memory 402, the following steps can be achieved:

obtaining video surveillance data and initial AIS data;

filtering the initial AIS data to obtain effective AIS data;

determining the current position of the vessel based on the effective AIS data, and projecting the current position of the vessel into the corresponding image of the video surveillance data to obtain the visual motion trajectory of the vessel;

inputting the video surveillance data into a target detection network to obtain target detection boxes corresponding to multiple vessels;

determining an occluded area based on the target detection boxes corresponding to the multiple vessels at the previous time, after deleting the part of the target detection boxes corresponding to the multiple vessels at the current time that falls into the occluded area, determining a prediction detection box of the occluded area based on the visual tracking trajectory of the vessel at the previous time, and determining real-time appearance features based on the appearance features of the prediction detection box before occlusion;

inputting the prediction detection box, the real-time appearance features, and the target detection boxes under a non-occlusion state at the current time into a preset DeepSORT algorithm model, and carrying out the anti-occlusion tracking of the vessel based on the preset DeepSORT algorithm model to obtain a visual tracking trajectory of the vessel at the current time;

based on the visual motion trajectory and the visual tracking trajectory of the vessel at the current time, fusing the effective AIS data corresponding to the multiple vessels into the video surveillance data to determine identities of the multiple vessels;

It should be understood that when the processor 401 executes the tracking and identification program for multiple vessel targets in the memory 402, in addition to the above functions, other functions can also be implemented, as described in the corresponding method embodiments earlier.

Furthermore, this embodiment does not specify the type of electronic device 400 mentioned. Electronic device 400 can be a portable electronic device such as a mobile phone, tablet, personal digital assistant (PDA), wearable device, laptop, etc. Examples of portable electronic devices include, but are not limited to, portable electronic devices equipped with IOS, Android, Microsoft, or other operating systems. The above-mentioned portable electronic devices can also be other portable electronic devices, such as laptops with touch-sensitive surfaces (such as touch panels). It should also be understood that in some other embodiments of this disclosure, the electronic device 400 may not be a portable electronic device, but a desktop computer with a touch sensitive surface (such as a touch panel).

On the other hand, this disclosure also provides a non-transient computer-readable storage medium on which a computer program is stored, which is implemented by the processor to execute the tracking and identification methods for multiple vessel targets provided by the above methods. The method includes:

obtaining video surveillance data and initial AIS data;

filtering the initial AIS data to obtain effective AIS data;

determining the current position of the vessel based on the effective AIS data, and projecting the current position of the vessel into the corresponding image of the video surveillance data to obtain the visual motion trajectory of the vessel;

inputting the video surveillance data into a target detection network to obtain target detection boxes corresponding to multiple vessels;

determining an occluded area based on the target detection boxes corresponding to the multiple vessels at the previous time, after deleting the part of the target detection boxes corresponding to the multiple vessels at the current time that falls into the occluded area, determining a prediction detection box of the occluded area based on the visual tracking trajectory of the vessel at the previous time, and determining real-time appearance features based on the appearance features of the prediction detection box before occlusion;

inputting the prediction detection box, the real-time appearance features, and the target detection boxes under a non-occlusion state at the current time into a preset DeepSORT algorithm model, and carrying out the anti-occlusion tracking of the vessel based on the preset DeepSORT algorithm model to obtain a visual tracking trajectory of the vessel at the current time;

based on the visual motion trajectory and the visual tracking trajectory of the vessel at the current time, fusing the effective AIS data corresponding to the multiple vessels into the video surveillance data to determine identities of the multiple vessels;

Those skilled in the art can understand that all or part of the process of implementing the above embodiment method can be completed by instructing the relevant hardware through a computer program, which can be stored in a computer-readable storage medium. Among them, computer readable storage media include magnetic disks, optical disks, read-only storage memory, or random storage memory.

It is to be understood, however, that even though numerous characteristics and advantages of this disclosure have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A tracking and identification method for multiple vessel targets, comprising:

obtaining video surveillance data and initial AIS data;

filtering the initial AIS data to obtain effective AIS data;

based on the effective AIS data, determining a current position of a vessel, based on the video surveillance data, obtaining parameters of a camera, based on the parameters of the camera, combined with a pinhole imaging model, projecting the current position of the vessel to an image coordinate system corresponding to the video surveillance data; extracting motion characteristics of the effective AIS data in the video surveillance data from projected data, and obtaining a visual motion trajectory of the vessel based on the motion characteristics of the effective AIS data in the video surveillance data;

inputting the video surveillance data into a target detection network to obtain target detection boxes corresponding to multiple vessels; the target detection network is obtained based on a training of Yolov5-s network;

determining an occluded area based on the target detection boxes corresponding to the multiple vessels at a previous time, after deleting a part of the target detection boxes corresponding to the multiple vessels at the current time that falls into the occluded area, determining a prediction detection box of the occluded area based on the visual tracking trajectory of the vessel at the previous time, and determining real-time appearance features based on appearance features of the prediction detection box before occlusion;

inputting the prediction detection box, the real-time appearance features, and the target detection boxes under a non-occlusion state at the current time into a preset DeepSORT algorithm model, and carrying out an anti-occlusion tracking of the vessel based on the preset DeepSORT algorithm model to obtain a visual tracking trajectory of the vessel at the current time;

based on the visual motion trajectory and the visual tracking trajectory of the vessel at the current time, fusing the effective AIS data corresponding to the multiple vessels into the video surveillance data to determine identities of the multiple vessels;

wherein, the parameters of the camera include position of the camera, orientation of the camera, horizontal field angle of the camera, vertical field angle of the camera, height of the camera from water surface, and resolution of the video surveillance data taken by the camera.

2. The tracking and identification method for multiple vessel targets according to claim 1, based on the visual motion trajectory and the visual tracking trajectory of the vessel at the current time, fusing the effective AIS data corresponding to the multiple vessels into the video surveillance data to determine identities of the multiple vessels, comprising:

carrying out similarity measurement between the motion characteristics of the effective AIS data in the video surveillance data and motion characteristics of the visual tracking trajectory of the vessel at the current time, and obtaining a result of the similarity measurement;

based on the result of the similarity measurement, fusing the effective AIS data corresponding to the multiple vessels into the video surveillance data to determine the identities of the multiple vessels.

3. The tracking and identification method for multiple vessels targets according to claim 2, based on the result of the similarity measurement, fusing the effective AIS data corresponding to the multiple vessels into the video surveillance data to determine the identities of the multiple vessels, comprising:

based on the result of the similarity measurement and preset weight coefficients, constructing a total similarity function;

constructing a cost matrix based on an output result of the total similarity function;

determining an optimal matching result of the cost matrix based on the Hungarian algorithm;

based on the optimal matching result, fusing the effective AIS data corresponding to the multiple vessels into the video surveillance data to determine the identities of the multiple vessels.

4. The tracking and identification method for multiple vessels targets according to claim 3, wherein, the expression for the total similarity function is:

$$C_g=\lambda_1 \cdot C_c + \lambda_2 \cdot C_d + \lambda_3 \cdot C_s$$

wherein, $C_g$ represents a total cost indicator, $C_c$ represents a similarity in the direction of motion, $C_s$ represents a similarity of motion speed, $C_l$ represents a distance similarity, $\lambda_1$, represent a weight coefficient corresponding to the similarity in the direction of motion, $\lambda_2$ represent a weight coefficient corresponding to the similarity of motion speed, and $\lambda_3$ represent a weight coefficient corresponding to the distance similarity.

5. The tracking and identification method for multiple vessels targets according to claim 2, carrying out similarity measurement between the motion characteristics of the effective AIS data in the video surveillance data and motion characteristics of the visual tracking trajectory of the vessel at the current time, and obtaining a result of the similarity measurement, comprising:

calculating a similarity of motion direction, a similarity of motion speed, and a similarity of current position, wherein the similarity of motion direction $C_c$ is expressed as:

$$C_c = \begin{cases} 0, |d(COG) - d(ves)| \leq \rho \\ 1, |d(COG) - d(ves)| > \rho \end{cases}$$

wherein, d(COG) represents a vessel motion direction extracted from the visual motion trajectory of the vessel after AIS longitude and latitude data is projected onto the image coordinate system, and d(ves) represents a vessel direction in video image, ρ is set to 90 degrees.

6. The tracking and identification method for multiple vessel targets according to claim 1, based on the parameters of the camera, combined with a pinhole imaging model, projecting the current position of the vessel to an image coordinate system corresponding to the video surveillance data, comprising:

based on the parameters of the camera, the pinhole imaging model, and the characteristic information of the vessel, constructing a geometric relation between a view angle of the transverse and longitudinal field of the camera and the position of the vessel at the current time;

based on the geometric relation, determining the horizontal and vertical coordinates of the vessel in the image corresponding to the effective AIS data, and projecting the position of the vessel at the current time to the image coordinate system based on the horizontal and vertical coordinates of the vessel in the image corresponding to the video surveillance data.

7. The tracking and identification method for multiple vessel targets according to claim 1, determining an occluded area based on the target detection boxes corresponding to the multiple vessels at a previous time, comprising:

in the target detection box corresponding to the multiple vessels at the previous time, the target detection box whose overlap degree with other target detection boxes is higher than a set threshold value is determined as the occluded area.

8. The tracking and identification method for multiple vessel targets according to claim 1, the effective AIS data comprises: vessel speed, vessel course, and vessel latitude and longitude coordinates.

9. An electronic device, comprising a memory and a processor, wherein:
the memory is used for storing a program;
the processor, which is coupled with the memory, is used to execute the program stored in the memory to implement the steps in the tracking and identification method for multiple vessel targets as in claim 1.

10. A non-transient computer readable storage medium, which stores a computer program, when the computer program is executed by a processor, the tracking and identification method for multiple vessel targets as in claim 1 is implemented.

11. A tracking and identification device for multiple vessel targets, comprising:
an acquisition module, configured to obtain video surveillance data and initial AIS data;
a filtering module, configured to filter the initial AIS data to obtain effective AIS data;
an extraction module, which is used configured to determine the current position of a vessel based on the effective AIS data, to obtain the parameters of a camera based on the video surveillance data, to project the current position of the vessel to an image coordinate system corresponding to the video surveillance data based on the parameters of the camera, combined with a pinhole imaging model, to extract motion characteristics of the effective AIS data in the video surveillance data from projected data, and to obtain a visual motion trajectory of the vessel based on the motion characteristics of the effective AIS data in the video surveillance data;
a detection module, which is used to input the video surveillance data into a target detection network to obtain target detection boxes corresponding to multiple vessels; the target detection network is obtained based on a training of Yolov5-s network;
a determination module, which is used to determine an occluded area based on the target detection boxes corresponding to the multiple vessels at a previous time, after deleting a part of the target detection boxes corresponding to the multiple vessels at the current time that falls into the occluded area, determining a prediction detection box of the occluded area based on the visual tracking trajectory of the vessel at the previous time, and determining real-time appearance features based on a appearance features of the prediction detection box before occlusion;
a tracking module, which is used to input the prediction detection box, the real-time appearance features, and the target detection boxes under a non-occlusion state at the current time into a preset DeepSORT algorithm model, and carrying out an anti-occlusion tracking of the vessel based on the preset DeepSORT algorithm model to obtain a visual tracking trajectory of the vessel at the current time;
a fusion module, which is used to fuse the effective AIS data corresponding to the multiple vessels into the video surveillance data based on the visual motion trajectory and the visual tracking trajectory of the vessel at the current time to determine identities of the multiple vessels;
wherein, the parameters of the camera include position of the camera, orientation of the camera, horizontal field angle of the camera, vertical field angle of the camera, height of the camera from water surface, and resolution of the video surveillance data taken by the camera.

* * * * *